Patented May 11, 1948

2,441,530

UNITED STATES PATENT OFFICE 2,441,530

MEROCARBOCYANINE DYES CONTAINING A CYCLOALKYL GROUP ON THE DIMETHINE CHAIN

Leslie G. S. Brooker and Grafton H. Keyes, Rochester, N. Y., assignors to Eastman Kodak Company, Rochester, N. Y., a corporation of New Jersey No Drawing. Application June 1, 1945, Serial No. 597,150

10 Claims. (Cl. 260—240)

This invention relates to merocarbocyanine dyes containing a cycloalkyl group on the dimethine chain and to a process for the preparation thereof, as well as to photographic emulsions sensitized therewith. This application is a continuation-in-part of our copending application Serial No. 515,978, filed December 28, 1943.

Merocarbocyanine dyes containing alkyl groups on the dimethine chain are known (see United States Patent 2,165,338, dated July 11, 1939) and some of these are strong sensitizers of photographic silver halide emulsions. We have now succeeded in obtaining merocarbocyanine dyes containing a cycloalkyl group on the dimethine chain and have found that certain of these new dyes (those containing a cyclopropyl group on the dimethine chain) are stronger sensitizers of photographic silver halide emulsions than the known merocarbocyanine dyes containing on the dimethine chain a straight chain alkyl group of equal carbon content.

It is, accordingly, an object of our invention to provide merocarbocyanine dyes having a cycloalkyl group on the dimethine chain and to provide a process for the preparation thereof. A further object is to provide photographic emulsions sensitized with such dyes. Other objects will become apparent hereinafter.

The dyes of our invention can be presented by the following general formula:

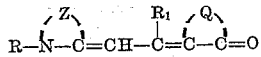

wherein R represents an alkyl group (i. e. alcohol radical), $R_1$ represents a cycloalkyl group containing from 3 to 6 carbon atoms in the ring, Q represents the non-metallic atoms necessary to complete a 5-membered heterocyclic or a 6-membered heterocyclic nucleus, e. g. a 2-thio-2,4(3,5)-thiazoledione nucleus (e. g. rhodanine, 3-ethyl-rhodanine or 3-phenylrhodanine), a 2,4(3,5)-thiazoledione nucleus, a 2-thio-2,4(3,5)-oxazoledione nucleus, a 2-alkylmercapto-4(5)-thiazolone nucleus, a 2-diphenylamino-4(5)-thiazolone nucleus, a 2-alkylphenylamino-4(5)-thiazolone nucleus, a 2-thio-2,4(3,5)-imidazoledione nucleus (e. g. thiohydantoin, 1,3-diethyl-2-thiohydantoin, a 1-ethyl-3-phenyl-2-thiohydantoin, a 1,3-diphenyl-2-thiohydantoin) a 2-alkylmercapto-5(4)-imidazolone nucleus, a barbituric acid nucleus or a thiobarbituric acid nucleus, etc., and Z represents the non-metallic atoms necessary to complete a heterocyclic nucleus selected from the group consisting of those of the benzothiazole series, those of the benzoselenazole series, those of the α-naphthothiazole series, those of the β-naphthothiazole series, those of the α-naphthoselenozole series and those of the β-naphthoselenazole series.

In accordance with our invention, we provide the aforesaid merocarbocyanine dyes containing a cycloalkyl group on the dimethine chain by condensing a cyclammonium quaternary salt containing in a reactive position (i. e. the α- or γ-position) a β-cycloalkyl-β-alkylmercaptovinyl group with a heterocyclic compound containing a ketomethylene (—CO—CH$_2$—) group, especially heterocyclic compounds containing any of the following groups: —CO—CH$_2$—O—, —CO—CH$_2$—S— and —CO—CH$_2$—ND— (wherein D represents hydrogen, alkyl or aryl, for example) in the ring, e. g. rhodanine, a 3-alkylrhodanine, a 3-phenylrhodanine, a 3-alkyl-2-thio-2,4(3,5)-oxazoledione, a 2-alkylmercapto-4(5)-thiazolone, a 2-diphenylamino-4(5)-thiazolone, a 2-alkylphenylamino-4(5)-thiazolone, a 2-thio-2,4(3,5)-imidazoledione nucleus (e. g. thiohydantoin, 1,3-diethyl-2-thiohydantoin, 1-ethyl-3-phenyl-2-thiohydantoin or 1,3-diphenyl-2-thiohydantoin, a 2-alkylmercapto-5(4)-imidazolone, a thiobarbituric acid nucleus, etc.). The aforesaid cyclammonium quaternary salts include those of the benzothiazole series, those of the benzoselenazole series, those of the α-naphthothiazole series, those of the β-naphthothiazole series, those of the α-naphthoselenazole series and those of the β-naphthoselenazole series.

The condensations are advantageously carried out in the presence of a basic condensing agent. Alcoholic solutions of tertiary amines, such as triethylamine, N-alkylpiperidines or pyridine are advantageously employed as basic condensing agents. Heat accelerates the condensations.

The following examples will serve to illustrate our new dyes and the manner of obtaining the same.

*Example 1.*—3-ethyl-5-[(3 - ethyl - 2(3) - benzothiazolylidene) - α - cyclopropylethylidene] - 2 - thio-2,4(3,5)-oxazoledione

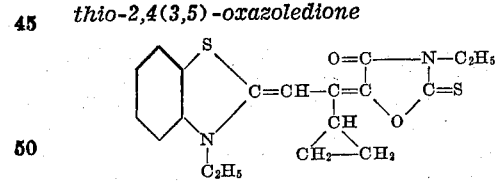

1.3 g. (1 mol.) of 2-cyclopropylthioformylmethylene-3-ethylbenzothiazoline and 1 g. (1 mol.) of methyl-p-toluenesulfonate were heated together at the temperature of a steam bath for 30 minutes. The mercapto intermediate thus formed was dissolved in 30 cc. of absolute ethyl alcohol and .7 g. of 3-ethyl-2-thio-2,4-(3,5)-oxazoledione. 1 g. (2 mol.) of triethylamine were added. The mixture was refluxed for 15 minutes. Dye separated on chilling. It was purified by recrystallization from methyl alcohol and obtained as scarlet needles with a blue reflex. Melting point 193°–195° C. dec.

*Example 2. — 3 - ethyl - 5-[(3-ethyl-2(3)-benzothiazolylidene) - α - cyclohexylethylidene] - 2 - thio-2,4(3,5)-oxazoledione*

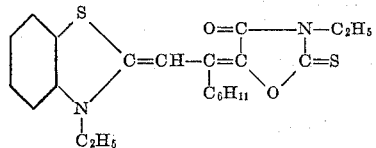

3 g. (1 mol.) of 2-cyclohexylthioformylmethylene-3-ethylbenzothiazoline and 2 g. (1 mol.) of methyl-p-toluene-sulfonate were heated together on a steam bath for 30 minutes. The mercapto intermediate thus formed was dissolved in 30 cc. of absolute ethyl alcohol. To this solution was added 1.45 g. (1 mol.) 3-ethyl-2-thio-2,4(3,5)-oxazoledione and 1 g. (1 mol.) triethylamine and the mixture refluxed for 15 minutes. After chilling, the dye which had separated was collected on filter, washed with water, methyl alcohol and dried. It was purified by two recrystallizations from methyl alcohol. Melting point 158°–160° C.

methyl alcohol and dried. It was purified by recrystallization from methyl alcohol and obtained as reddish needles. Melting point 135°–137° C.

*Example 4. — 3 - ethyl-5-[(3-ethyl-2(3) - benzothiazolylidene) - α - cyclopropylethylidene] - rhodanine*

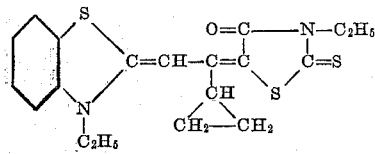

1.3 g. (1 mol.) of 2-cyclopropylthioformylmethylene-3-ethylbenzothiazoline and 1 g. (1 mol.) of methyl-p-toluene-sulfonate were heated together at the temperature of a steam bath for 30 minutes. The mercapto intermediate thus formed was dissolved in 20 cc. of absolute ethyl alcohol and .8 g. (1 mol.) of 3-ethylrhodanine, 1 g. (2 mol.) triethylamine were added. This mixture was then heated under reflux for 15 minutes. Dye separated on chilling. It was purified by recrystallization from a mixture of pyridine and methyl alcohol and obtained as metallic needles. Melting point 197°–199° C.

In a manner similar to that illustrated in the foregoing examples, α- and β-naphthothiazole, α- and β-naphthoselenazole and benzoselenazole quaternary salts containing a β-cycloalkyl-β-alkylmercaptovinyl group in the α-position can be condensed with heterocyclic compounds containing a ketomethylene group to give merocyanine dyes. The following condensations are exemplary:

| quaternary salt | ketomethylene compound |
|---|---|
| 2 - (β - cyclopropyl - β - methylmercaptovinyl) - benzothiazole n-buto-p - toluenesulfonate. | 2 - ethylphenylamino - 4(5) - thiazolone. |
| Do. | thiobarbituric acid. |
| 5 - chloro - 2(β - cyclopropyl - β - ethylmercaptovinyl) - benzo - thiazole n - propo - p - toluenesulfonate. | 3 - phenylrhodanine. |
| 2 - (β - cyclobutyl - β - methylmercaptovinyl) - benzoselenazole etho - p - toluenesulfonate. | 3 - carbethoxymethylrhodanine. |
| 2 - (β - cyclopropyl - β - methylmercaptovinyl) - benzothiazole β - eth-oxyetho - p - toluenesulfonate. | 3 - (p - dimethylamino) - rhodanine. |
| 2 - (β - cyclopropyl - β - methylmercaptovinyl) - benzoselenazole metho - p - toluenesulfonate. | 2 - diphenylamino - 4(5) - thiazolone. |
| 2 - (β - cyclopropyl - β - methylmercaptovinyl) - β - naphthothiazole etho - p - toluenesulfonate. | 1, 3 - diphenyl - 2 - thiohydantoin. |
| 2 - (β - cyclopropyl - β - methylmercaptovinyl) - α - naphthothiazole etho - p - toluenesulfonate. | 3 - phenylrhodanine. |
| 2 - (β - cyclopropyl - β - n - butylmercaptovinyl) - β - naphthoselenazole metho - p - toluenesulfonate. | 3 - ethyl - 2 - thio - 2,4(3,5) - oxazoledione. |
| 2 - (β - cyclopropyl - β - methylmercaptovinyl) - benzothiazole etho - p - toluenesulfonate. | 1,3 - diphenyl - 2 - thiohydantoin. |
| 2 - (β - cyclopropyl - β - methylmercaptovinyl) - benzothiazole allo - p - toluenesulfonate. | 1 - ethyl - 3 - phenyl - 2 - thiohydantoin. |
| 2 - (β - cyclopentyl - β - methylmercaptovinyl) - benzothiazole ethiodide. | 3 - ethylrhodanine. |
| 2 - (β - cyclopropyl - β - methylmercaptovinyl) - benzothiazole etho - p - toluenesulfonate. | rhodanine. |

*Example 3. — 3-ethyl - 5 - [(3-ethyl-2(3)-benzothiazolylidene) - α - cyclobutylethylidene] - 2 - thio-2,4(3,5)-oxazoledione*

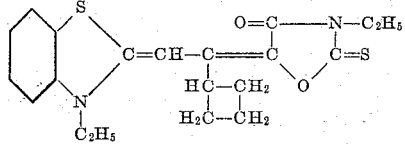

1.4 g. (1 mol.) of 2-cyclobutylthioformylmethylene-3-ethylbenzothiazoline and 1 g. (1 mol.) methyl-p-toluenesulfonate were heated together on a steam bath for 30 minutes. The mercapto intermediate thus formed was dissolved in 20 cc. of absolute ethyl alcohol, .75 g. (1 mol.) 3-ethyl-2-thio-2,4(3,5)-oxazoledione and 1 g. (2 mol.) triethylamine were added and the whole refluxed for 15 minutes. Dye separated on chilling and was collected on a filter, washed with A convenient method of preparing dyes containing a 2-alkylmercapto-4(5)-thiazolone nucleus is to begin with a dye containing a simple rhodanine nucleus, e. g. 5-[(3-ethyl-2(3)-benzothiazolylidene)-α-cyclopropylethylidene]rhodanine is subjected to alkylation. Thus, to prepare 2-methylmercapto-5 - [(3 - ethyl - 2(3)-benzothiazolylidene) - α-cyclopropylethylidene]rhodanine, 1 mol. of 5-[(3-ethyl-2(3)-benzothiazolylidene) - α-cyclopropylethylidene]rhodanine was suspended in ethyl alcohol (95%) and 1 mol. of powdered potassium hydroxide was added, followed by 1.2 mol. of methyl-p-toluene-sulfonate. The resulting mixture was refluxed for about one hour. The 2-methylmercapto dye separated from the reaction mixture upon cooling. It was recrystallized from methyl alcohol.

The thioketones from which the β-cycloalkyl-β-alkylmercaptovinyl compounds are prepared are described in our parent application Serial No.

515,978, as well as in the copending application of Grafton H. Keyes, Serial No. 597,149, filed of even date herewith (now United States Patent 2,429,469, dated October 21, 1947).

What we claim as our invention and desire to be secured by Letters Patent of the United States is:

1. The merocarbocyanine dyes which are represented by the following general formula:

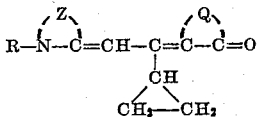

wherein R represents an alkyl group, Z represents the non-metallic atoms necessary to complete a heterocyclic nucleus selected from the group consisting of those of the benzothiazole series, those of the benzoselenazole series, those of the α-naphthothiazole series, those of the β-naphthothiazole series, those of the α-naphthoselenazole series and those of the β-naphthoselenazole series, and Q represents the non-metallic atoms necessary to complete a heterocyclic nucleus selected from the group consisting of 5-membered and 6-membered heterocyclic nuclei.

2. The merocarbocyanine dyes which are represented by the following general formula:

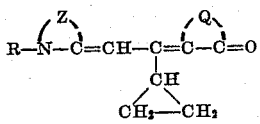

wherein R represents a primary alkyl group containing from 1 to 4 carbon atoms, Z represents a heterocyclic nucleus of the benzothiazole series and Q represents the non-metallic atoms necessary to complete a heterocyclic nucleus of the rhodanine series.

3. The merocarbocyanine dyes which are represented by the following general formula:

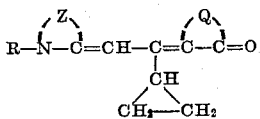

wherein R represents a primary alkyl group containing from 1 to 4 carbon atoms, Z represents a heterocyclic nucleus of the benzothiazole series and Q represents the non-metallic atoms necessary to complete a heterocyclic nucleus of the 2-thio-2,4(3,5)-oxazoledione series.

4. The merocarbocyanine dye of the following formula:

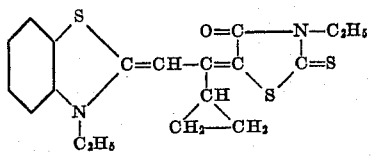

5. The merocarbocyanine dye of the following formula:

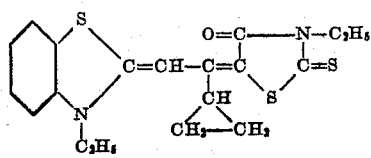

6. The merocarbocyanine dyes which are represented by the following general formula:

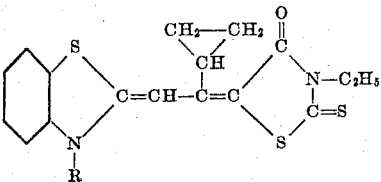

wherein R represents a primary alkyl group containing from 1 to 4 carbon atoms.

7. The merocarbocyanine dyes which are represented by the following general formula:

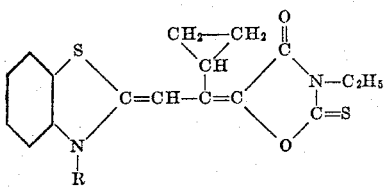

wherein R represents a primary alkyl group containing from 1 to 4 carbon atoms.

8. The merocarbocyanine dyes which are represented by the following general formula:

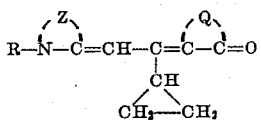

wherein R represents a primary alkyl group containing from 1 to 4 carbon atoms, Z represents the non-metallic atoms necessary to complete a benzothiazole nucleus and Q represents the non-metallic atoms necessary to complete a 2-thiohydantoin nucleus.

9. The merocarbocyanine dyes which are represented by the following general formula:

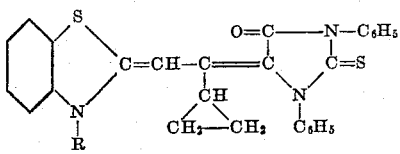

wherein R represents a primary alkyl group containing from 1 to 4 carbon atoms.

10. The merocarbocyanine dye which is represented by the following formula:

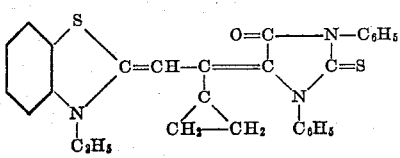

LESLIE G. S. BROOKER.
GRAFTON H. KEYES.

REFERENCES CITED

The following references are of record in the file of this patent:

UNITED STATES PATENTS

| Number | Name | Date |
| --- | --- | --- |
| 2,106,383 | Schneider | Jan. 25, 1938 |
| 2,165,338 | Brooker | July 11, 1939 |